(12) United States Patent
Liu et al.

(10) Patent No.: US 7,903,617 B2
(45) Date of Patent: Mar. 8, 2011

(54) METHOD AND SYSTEM FOR MULTIUSER WIRELESS COMMUNICATIONS USING ANTI-INTERFERENCE TO INCREASE TRANSMISSION DATA RATE

(76) Inventors: Ruey-Wen Liu, South Bend, IN (US); Rendong Ying, Shanghai (CN)

( * ) Notice: Subject to any disclaimer, the term of this patent is extended or adjusted under 35 U.S.C. 154(b) by 470 days.

(21) Appl. No.: 12/126,703

(22) Filed: May 23, 2008

(65) Prior Publication Data
US 2008/0219209 A1 Sep. 11, 2008

Related U.S. Application Data

(63) Continuation-in-part of application No. 12/123,992, filed on May 20, 2008, now abandoned, which is a continuation of application No. 11/002,161, filed on Dec. 2, 2004, now Pat. No. 7,376,394.

(60) Provisional application No. 60/940,330, filed on May 25, 2007, provisional application No. 60/526,512, filed on Dec. 3, 2003.

(51) Int. Cl.
*H04B 7/216* (2006.01)
*H04B 1/00* (2006.01)
(52) U.S. Cl. .......... 370/335; 370/342; 375/144; 375/148
(58) Field of Classification Search .................. None
See application file for complete search history.

(56) References Cited

U.S. PATENT DOCUMENTS

| | | | |
|---|---|---|---|
| 4,494,228 A * | 1/1985 | Gutleber | 370/342 |
| 5,761,237 A * | 6/1998 | Petersen et al. | 375/148 |
| 6,680,967 B1 * | 1/2004 | Westman | 375/148 |
| 6,707,805 B2 | 3/2004 | Ozluturk et al. | |
| 7,106,801 B1 | 9/2006 | Guruprasad | |
| 7,155,165 B1 | 12/2006 | Kowalewki | |
| 7,376,394 B2 | 5/2008 | Liu | |
| 2002/0048286 A1 | 4/2002 | Brunel | |
| 2004/0005077 A1 | 1/2004 | Bilobrov et al. | |
| 2004/0264561 A1 | 12/2004 | Alexander et al. | |

OTHER PUBLICATIONS

Oppenheim, et al., "Design of Fir Filters by Windowing," *Discrete-Time Signal Processing*, Chapter 7; 7.4, pp. 444-474, Prentice Hall, Inc. 1989.
Vaidyanathan, "The Wavelet Transform," *Multirate Systems and Filter Banks*, Part 3; 11.3, pp. 481-500; Prentice Hall, Inc. 1993.
Proakis, "Some Applications of DS Spread Spectrum Signals," *Digital Communications*, Chapter 12;12-2-2, pp. 712-415; McGraw Hill, Inc., 1995.

(Continued)

*Primary Examiner* — Nittaya Juntima
(74) *Attorney, Agent, or Firm* — Leydig, Voit & Mayer, Ltd.

(57) ABSTRACT

A method and system for multi-user wireless communications between a sender and a receiver enables effective blocking of interference signals by other senders and improving the channel data rate. The receiver uses two or more receiving devices, such as antennas or smart antennas, to receive multiple wireless input signals. By performing a noise-transparent autocorrelation matching analysis on the multiple input signals, the receiver derives an anti-interference filter for interference-blocking action, without the need for information of the interfering and its transmission channel. In a multi-user environment, the noise-transparent autocorrelation matching analysis is implemented by the Autocorrelation Division Multiple Access (ADMA) system that includes the design and the implementation of ADMA code, the ADMA encoder, the ADMA algorithm and the ADMA decoder.

11 Claims, 5 Drawing Sheets

OTHER PUBLICATIONS

Chevreuil et al., "Blind Equalization in the Presence of Jammers and Unknown Noise; Solutions Based on Second-Order Cyclostationary Statistics," *IEEE Trans. on Signal Processing*, pp. 259-263, vol. 46, No. 1 (Jan. 1998).

Belouchrani et al., "A Two-Sensor Array Blind Beamformer for Direct Sequence Spread Spectrum Communications," *IEEE Trans on Signal Processing*, pp. 2191-2199, vol. 47, No. 8 (Aug. 1999).

Liu, et al., "Autocorrelation—A New Differentiation Factor for Random Multiple Access Wireless Communication," *Proc. ISCAS*, vol. III, pp. 643-646, Phoenix, AZ (May 2002).

Winters, "Optimal Combining in Digital Mobile Radio with Cochannel Interference," *IEEE J. Sel. Areas Communication*, vol. 2, No. 4., pp. 528-539 (Jul. 1984).

Viterbi et al., "Capacity, Coverage, and Control of Spread Spectrum Multiple Access Networks," *CDMA: Principle of Spread Spectrum Communication*, Chapter 6; 6.1, pp. 179-180; Addison-Wesley Longman, Inc. (1995).

Proakis, "Multiuser Communications," *Digital Communications*, 4th Edition, Chapter 15, pp. 896-899, 2001, McGraw-Hill.

Luo et al., "Blind Equalization for MIMO FIR Channels Based Only on Second Order Statistics by Use of Pre-Filters," $2^{nd}$ *IEEE Signal Processing Workshop on Signal Processing Advances in Wireless Communications* (SPAWC'99), May 9-12, 1999, Annapolis, MD., pp. 106-109.

Luo et al., "The Autocorrelation Matching Method for Distributed MIMO Communications Over Unknown FIR Channels," *Proc. of ICASSP*, Salt Lake City, UT, USA, pp. 2161-2164, 2001.

Xavier et al., "Closed-form Blind Channel identification and Source Separation in SDMA Systems Through Correlative Coding," *IEEE Journal on Selected Areas in Communications*, vol. 16, No. 8, pp. 1506-1517, 1998.

Lindgren et al., "Source Separation Using a Criterion Based on Second-Order Statistics," *IEEE Trans, on Signal Processing*, vol. 46, No. 7, pp. 1837-1850, 1998.

Hua, Yingbo, "Blind Identification and Equalization of Channels Driven by Colored Signals," *Signal Processing Advances in Wireless & Mobile Communications*, vol. I, Chapter 4, pp. 113-137, Prentice Hall, 2001.

Liu et al., "Multi-User Blind Channel Equalization and Signal Discrimination by NIA Matched Filters," *Proc. of IEEE CAS Notre. Dame Workshop on Wireless Communications and Networking*, Notre Dame, IN, pp. 1-4, Aug. 2001.

Scaglione et al., "Linear Preceding for Estimation and Equalization of Frequency-Selective Channels," *Signal Processing Advances in Wireless & Mobile Communications*, vol. 1, Chapter 9, pp. 291-337, Prentice Hall, 2001.

Tarokh et al., "Space-Time Block Codes from Orthogonal Designs," *IEEE Trans, on Information Theory*, vol. 45, No. 5, pp. 1456-1467, Jul. 1999.

Luo et al., "Apply Autocorrelation Matching Method to Outdoor Wireless LAN on Co-Channel Interference Suppression and Channel Equalization," in *Proc. of Wireless Communications Networks Conference*, Orlando, FL, pp. 459-464, Mar. 17-21, 2002.

Song et al., "A New Multiple-Access Scheme Based on the Diversity of Autocorrelation," *IEEE ICC 2003 International Conference on Communication*, pp. 720-724.

Foschini et al., "On Limits of Wireless Communication in a Fading Environment when Using Multiple Antennas," *Wireless Personal Communication*, 6, pp. 311-335,1998.

Massey et al., "Inverses of Linear Sequential Circuits," *IEEE Trans. on Computers*, vol. C-17, No. 4, pp. 330-337, Apr. 1968.

Inouye et al., "A System-Theoretic Foundation for Blind Equalization of FIR MIMO Channel Systems," *IEEE Transactions on Circuits and Systems-I, Fundamental Theory and Applications*, vol. 49, No. 4, pp. 425-436, Apr. 2002.

Liu et al., "Direct Blind Deconvolution of Multiuser-Multichannel Systems," *11 Int. Symp. on Circuits and Systems*, Orlando, FL, pp. V-49-V-52, May 30-Jun. 2, 1999.

Kailath, "Linear Systems," Prentice-Hall, Sec. 6.3, pp. 389-395, 1980.

Gorokhov et al., "Subspace-Based Techniques for Blind Separation of Convolutive Mixtures with Temporally Correlated Source," *IEEE Trans. on Circuits and Systems-I, Fundamental Theory and Applications*, vol. 44, No. 9, pp. 813-820, Sep. 1997.

Tugnait, "FIR Inverses to MIMO Rational Transfer Functions with Applications to Blind Equalization," *IEEE Proc. $30^{th}$ Asilomar Conf.*, Pacific Grove, CA, pp. 295-299, 1997.

Gantmacher, "The Theory of Matrices," vol. 1, *AMS Chelsea Publishing*, New York: Chelsea, 1959.

Liu et al., "A System Theoretic Foundation for Blind Separation of MIMO-FIR Convolution Mixtures," *IEEE Signal Processing Society Second International Workshop on Independent Component Analysis and Blind Signal Separation*, pp. 205-210, Helsinki, Finland, Jun. 19-22, 2000.

Ketchum et al., "Adaptive Algorithm for Estimating and Suppressing Narrow-Band Interference in PN Spread-Spectrum Systems," *IEEE Trans. Communication*, vol. COM-30, No. 5, pp. 913-924, May 1982.

Milstein et al., "An Analysis of a Real-Time Transform Domain Filtering Digital Communication System: Part I: Narrowband Interference Rejection," *IEEE Trans. on Communication*, COM-28,No. 6, pp. 816-824, Jun. 1980.

Saulnier et al., "Wavelets and Filter Banks in Spread Spectrum Systems," A. N. Akansu and M. J. T. Smith Eds., Subband and Wavelet Transforms: Design and Application, Kluwer, pp. 309-345, 1995.

Lee et al., "Probability of Error Analyzes of a BFSK Frequency-Hopping System with Diversity Under Partial-Band Jamming Interference—Part I: Performance of Square-Law Linear Combining Soft Decision Receiver," *IEEE Trans. Communication*, vol. COM-32, pp. 645-653, Jun. 1984.

Lee, "Overview of the Technical Basis of Qualcomm's CDMA Cellular Telephone System Design—A View of North American TIA/EIA IS-95," Singapore ICCS, pp. 353-358, 1994 *IEEE*.

Luo et al., "Second-Order Statistics Blind MIMO-FIR Channel Equalization for Antenna Array-Based Wireless Communications Systems," *IEEE Sensor Array and Multichannel Signal Processing Workshop (SAM 2000)*, 2000, pp. 286-290.

Hua et al., "Blind Identification of Colored Signals Distorted by FIR Channels," *Proceedings of IEEE ICASSP 2000*, Istanbul, Turkey, Jun. 2000, pp. 3124-3127.

Hua et al., "Blind Identifiability of FIR-MIMO System with Colored Input Using Second Order Statistics," *IEEE Signal Processing Letter*, vol. 7, No. 12, Dec. 2000, pp. 348-350.

Liu et al., "Limitations and Applicability of SOS-Based Blind Techniques for Channel Equalization," *Proc. ECCTD*, Espoo, Finland, Aug. 2001, 5 pages.

Song et al., "A Novel Semi-Blind DS/CDMA Scheme," *Proc. IEEE CAS/Notre Dame Workshop on Wireless Communications and Networking*, University of Notre Dame, Notre Dame, IN., Aug. 2001, pp. 335-338.

Liu et al., "Autocorrelation—A New Differentiation Domain for Multiple Access Wireless Communication," *Proc. ISCAS*, vol. III, Phoenix, AZ., May 2002, pp. III-643-III-646.

Luo et al., "A Closed-Form Solution to the Autocorrelation Matching Method for Wireless MIMO Communications," *IEEE Workshop on Multimedia Signal Processing*, Dec. 2002, pp. 392-395.

Hong et al., "A Novel Algorithm for Blind Channel Identification Based on Modified Principle of Autocorrelation Matching," *Proc. TENCON'02, 2002 IEEE Region 10 Conference on Computers, Communications, Control and Power Engineering*, vol. 2, Oct. 2002, pp. 968-971.

Luo et al., "A Closed-Form Solution to Blind MIMO FIR Channel Equalization for Wireless Communication Systems Based on Autocorrelation Matching," *Proc. ICASSP*, vol. 4, Apr. 2003, pp. IV-293-IV-296.

Ying et al., "Decision Feedback for Autocorrelation Matching Anti-Jamming Filter," *Proc. Frontiers of Mobile and Wireless Communication*, vol. 1, 2004, pp. 33-36.

Wu et al., "Narrowband Interference Rejection in OFDM via carrier Interferometry Spreading Codes," *IEEE Trans. Wireless Communications*, vol. 4, No. 4, Jul. 2005, pp. 1491-1505.

Rappaport, *Wireless Communications, Principle and Practice*, Prentice Hall, 1966, Section 8.2, ISBN 7-5053-4886-8.

Proakis, *Digital Communication*, 4th Edition, McGraw-Hill Companies, 2001, Section 11.51, ISBN 0-07-232111-3.

Simon et al., *Spread Spectrum Communications Handbook*, McGraw-Hill Companies, 2002, Section 3.4, ISBN 0-07-138215-1.

Meyr et al., *Digital Communication Receivers: Synchronization, Channel Estimation and Signal Processing*, John Wiley and Sons, Inc., 1997.

Coulson, "Narrowband Interference in Pilot Symbol Assisted OFDM Systems," *IEEE Trans. Wireless Communications*, vol. 3, No. 6, Nov. 2004, pp. 2277-2287.

Hassibi et al., "How Much Training is Needed in Multiple-Antenna Wireless Links?", *Bell Laboratories, Lucent Technologies*, Oct. 22, 2001, pp. 1-30.

Wong et al., "Training Sequence Optimization in MIMO Systems with Colored Interference," (Technical report), pp. 1939-1947.

Tong et al., "Blind Identification and Equalization Based on Second-Order Statistics: A Time Domain Approach," *IEEE trans. on Information Theory*, vol. 40, No. 2, Mar. 1994, pp. 340-349.

Tong et al., "Blind Channel Identification Based on Second-Order Statistics: A Frequency-Domain Approach," *IEEE trans. on Information Theory*, vol. 41, No. 1, Jan. 1995, pp. 329-334.

Zeng et al., "Blind Channel Estimation Using the Second-Order Statistics: Algorithms," *IEEE trans. on Signal Processing*, vol. 45, No. 8, Aug. 1997, pp. 1919-1930.

Luo et al., "Blind Identification of Medium with Multi-Layer Structure," 3rd *International Conference on Signal Processing*, vol. 1, Oct. 14-18, 1996, pp. 404-407.

Luo et al., "Blind Equalization for MIMO FIR Channel Based Only on Second Order Statistics by Use of Pre-Filters," *Proc. of IEEE Workshop on Signal Processing Advances in Wireless Communication*, Annapolis, MD, USA, , 1999, pp. 106-109.

Liu et al., "A Modified Blind MIMO Channel Equalization Method Based on Autocorrelation Matching Principle," *2005 International Conference on Communications, Circuits and Systems, Proceedings*, vol. 1, May 27-30, 2005, pp. 215-218.

Lan et al., "Blind Equalization Based on the Modified Principle of Autocorrelation Matching," *ACTA Electronica Sinica*, vol. 31, No. 07, pp. 1095-1097, Jul. 2003.

Lan et al., "A Novel Algorithm for Blind Channel Identification Based on Modified Principle of Autocorrelation Matching," *IEEE Region 10 Conference on Computers, Communication, Control and Power Engineering (TENCON)*, vol. 2, Oct. 2002, pp. 968-971.

Marzetta et al., "Capacity of a Mobile Multiple-Antenna Communication Link in Rayleigh Flat Fading," *IEEE Transactions on Information Theory*, vol. 45, No. 1, Jan. 1999, pp. 139-157.

Gray, *Entropy and Information Theory*, 1990 Springer Verlag, Section 12-4.

Loyka et al., "New Compound Upper Bound on MIMO Channel Capacity," *IEEE Communication Letters*, vol. 6, No. 3, Mar. 2002, pp. 96-98.

Gesbert et al., "MIMO Wireless Channels: Capacity and Performance Prediction, 2000 IEEE, pp. 1083-1088".

Stevanovic et al., "Smart Antenna Systems for Mobile Communications Networks, Part 1: Overview and Antenna Design, IEEE Antenna's and Propagation Magazine, vol. 44, No. 3, Jun. 2002, pp. 145-154, and Part 2: Beamforming and Network Throughput," IEEE Antenna's and Propagation Magazine, vol. 44, No. 4, Aug. 2002, pp. 106-114.

Fredrick et al., "Smart Antennas Based on Spatial Multiplexing of Local Elements (SMILE) for Mutual Coupling Reduction," *IEEE Trans. on Antennas and Propagation*, vol. 52, No. 1, Jan. 2004, pp. 106-114.

Garg et al., "Use of Smart Antenna System in Universal Mobile Communications Systems (UMTS)," *IEEE Antennas and Wireless Propagation Letters*, vol. 3, 2004, pp. 66-70.

Fabbryccio et al., "Space-time Processing for Smart Antennas in Advanced Receivers for the User Terminal in 3G WCDMA Systems," *IEEE Transactions on Consumer Electronics*, vol. 48, No. 4, Nov. 2002, pp. 1082-1090.

Herscovici et al., "Smart Antennas," *IEEE Antennas and Propagration Magazine*, vol. 42, No. 3, Jun. 2000, pp. 129-136.

Jafar, "Fundamental Capacity Limits of Multiple Antenna Wireless Systems," Aug. 2003, PH.D. thesis, Sections 2.5 and 2.6.

Giannakis et al., "Signal Processing Advantages in Wireless and Mobile Communications, vol. 1: Trends in Channel Estimation and Equalization," Pearson Education, Prentice Hall PTR, 2001, ISBN 0130271624.

Wang et al., "Wireless Communication Systems: Advanced Techniques for Signal Reception," 1E, 0-13-021435-3, Pearson Education, 2004, Section 2.7.3.

Giannakis et al., "Signal Processing Advantages in Wireless and Mobile Communications, vol. 2: Trends in Single User and Multi-User Systems," Pearson Education, Prentice Hall PTR, 2001, ISBN 013027190X.

Tong et al., "Multichannel Blind Identification: From Subspace to Maximum Likelihood Methods," *Proc. IEEE*, vol. 86 , No. 10, Oct. 1998, pp. 1951-1968.

Loubaton et al., "On Blind Multiuser Forward Link Channel Estimation by the Subspace Approach: Identifiability Results," *IEEE Transactions on Signal Processing*, vol. 48, No. 8, Aug. 2000, pp. 2366-2376.

Moulines et al., "Subspace methods for the Blind Identification of Multichannel FIR Filters," *IEEE Transactions on Signal Processing*, vol. 43, No. 2, pp. 516-525, Feb. 1995.

Liu et al., "Blind equalization of MIMO-FIR channels driven by white but higher order colored source signals," *IEEE Transaction on Information Theory*, vol. 48, No. 5, May 2002, pp. 1206-1214.

Xu et al., "A Least-Squares Approach to Blind Channel Identification," *IEEE Transactions on Signal Processing*, vol. 43, No. 12, pp. 2982-2993, Dec. 1995.

Tong et al., "Blind Identification and Equalization of Multipath Channels," 1992, *IEEE*, ICC '92, pp. 1513-1517.

Mangalvedhe et al., "Blind CDMA Interference Rejection in Multipath Channels," 1997, *IEEE*, pp. 21-25.

Hyvärinen et al., Independent Component Analysis, 2001 John Wiley & Sons, Inc., Section 19, ISBN 0-471-40540-X.

Zhu et al., "A Blind Fractionally Spaced Equalizer Using Higher Order Statistics," *IEEE Transactions on Circuits and Systems II: Analog and Digital Signal Processing*, vol. 46, No. 6, pp. 755-764, Jun. 1999.

Kawamoto et al., "Blind Deconvolution Algorithms for MIMO-FIR Channels Driven by White but Fourth-Order Colored Signals," *Signals, Systems and Computers*, 2000. Conference Record of the Thirty-Fourth Asilomar Conference on, vol. 2, pp. 1202-1206, Oct. 29-Nov. 1, 2000.

Kawamoto et al., "A Deflation Algorithm for the Blind Deconvolution of MIMO-FIR Channels Driven by Fourth-Order Colored Signals," *IEEE International Conference on Acoustics, Speech, and Signal Processing, 2002. Proceedings: (ICASSP '02)*, vol. 2, pp. 1653-1656, 2002.

Inouye et al., "Critera for Direct Blind Deconvolution of MIMO FIR Systems Driven by White Source Signals," *Acoustics, Speech, and Signal Processing, 1999. ICASSP '99. Proceedings.*, 1999 IEEE International Conference on, vol. 5, 15-19, pp. 2889-2892, Mar. 1999.

Luo et al., "Blind equalizers for Multipath Channels With Best Equalization Delay," *IEEE International Conference on Acoustics, Speech, and Signal Processing, 1999. ICASSP '99. Proceedings*, , vol. 5, Mar. 15-19, 1999, pp. 2511-2514.

Chi et al., "Blind Equalization and System Identification Batch Processing Algorithms, Performance and Applications," ISBN 978-1-84628-022-1.

Liu, "A Fundamental Theorem for Direct Blind Equalization," *ISCAS '97; Proceedings of 1997 IEEE International Symposium on Circuits and Systems*, vol. 1, pp. 705-708, Jun. 9-12, 1997.

Dong et al., "Adaptive Blind Channel Identification," *ICC '96, Conference Record, Converging Technologies for Tomorrow's Applications. IEEE International Conference on Communications*, vol. 2, 23-27, pp. 828-831, Jun. 1996.

Cichocki et al., "Adaptive Blind Signal and Image Processing," John Wiley & Sons, 2002, Section 1.1.4, ISBN 7-121-01111-5.

Papadias et al., "A Constant Modulus Algorithm for Multiuser Signal Separation in Presence of Delay Spread Using Antenna Arrays," *IEEE Signal Processing Letters*, vol. 4, No. 6, Jun. 1997, pp. 178-181.

Godard, "Self-Recovering Equalization and Carrier Tracking in two-Dimensional Data Communication Systems," *IEEE Trans. Commun.*, vol. COM-28, No. 11, pp. 1867-1875, Nov. 1980.

Li et al., "Global Convergence of Fractionally Spaced Godard (CMA) Adaptive Equalizers," *IEEE Trans. Signal Processing*, vol. 44, No. 4, pp. 818-826, Apr. 1996.

Ding et al., "III-Convergence of Godard Blind Equalizers in Data Communication Systems," *IEEE Trans. Commun.*, vol. 39, No. 9, pp. 1313-1327, Sep. 1991.

Papoulis et al., "Probability, Random Variables and Stochastic Processes," Third Edition, McGraw-Hill Company, 2002, Section 11-4, ISBN 0-07-112256-7.

Gardner, "Introduction to Random Processes with Applications to signals and Systems," New York: Macmillan, 1985; ($2^{nd}$ ed: New York, McGraw-Hill, 1990).

Tarokh et al., "Space-Time Codes for High Data Rate Wireless Communication: Performance Criterion and Code Construction," *IEEE Trans. on Information Theory*, vol. 44, No. 2, Mar. 1998, Sections 7.3 and 7.4.

Tarokh et al., "Space-Time Block Coding for Wireless Communications: Performance Results," *IEEE Journal on Selected Areas in Communications*, vol. 17, No. 3, Mar. 1999, pp. 451-460.

Paulraj et al., Introduction to Space-Time Wireless Communications, Cambridge University Press, 2003, ISBN 7-302-10887-0.

Durgin, "Space Time Wireless Channel," *Pearson Education, Inc., Prentice Hall PRT*, 2003, ISBN 0-13-065647-X.

Bertsekas et al., "Convex Analysis and Optimization," *Athena Scientific Books*, 2003, ISBN 1-886529-45-0.

Horn et al., "Matrix Analysis," Cambridge University Press, 1986, ISBN 0-521-38632-2.

Horn et al., "Topics in Matrix Analysis." Cambridge University Press, 1991, ISBN 0-521-30587-X.

Wilson, "Digital Modulation and Coding," *Prentice-Hall*, 1996, ISBN 7-5053-4881-7.

Oppenheim et al., Discrete-time Signal Processing, $2^{nd}$ ed., *Prentice Hall/Pearson*, 2001, ISBN 7-5605-1465-0.

Van Trees, "Optimum Array Processing, Part IV of Detection, Estimation, and Modulation Theory," *John Wiley & Sons*, 2002, ISBN 0-471-09390-4.

Chen et al., "Adaptive Beamforming Schemes for Interference Cancellation in OFDM Communication Systems," 2004, *IEEE $59^{th}$ Vehicular Technology Conference*, vol. 1, May 2004, pp. 103-107.

Alamouti, "A Simple Transmit Diversity Technique for Wireless Communications," *IEEE Journal on Select Areas in Communications*, vol. 16, No. 8, Oct. 1998, pp. 1451-1458.

Sampath et al., "A Fourth-Generation MIMO-OFDM Broadband Wireless System: Design, Performance and Field Trial Results," *IEEE Communications Magazine*, Sep. 2002, pp. 143-149.

Zou et al., "COFDM: An Overview," *IEEE Trans. on Broadcasting*, vol. 41, No. 1, pp. 1-8, Mar. 1995.

van Nee et al., "OFDM Wireless Multimedia Communication," *Artech House* Boston, London, 2000, Chapter 2.

Weinstein et al., "Data transmission by frequency Division Multiplexing Using the Discrete Fourier Transform," *IEEE Trans. Comm.*, vol. COM-19, No. 5, pp. 628-634, Oct. 1971.

Hirosaki, "An Orthogonally Multiplexed OAM System Using the Discrete Fourier Transform," *IEEE Trans. Comm.*, vol. COM-28, No. 7, pp. 982-989, Jul. 1981.

Frederiksen et al., "An overview of OFDM and Related Techniques Towards Development of Future Wireless Multimedia Communications," Radio and Wireless Conference, 2002, RAWCON 2002, *IEEE*, Aug. 11-14, 2002, pp. 19-22.

Singh et al., "Adaptive Interference Suppression for DS-CDMA," *IEEE Trans. on Communications*, vol. 50, No. 12, Dec. 2002, pp. 1902-1905.

Yu et al., "Independent Multitone Jamming of FH/MFSK in Rician Channels," *IEEE Trans. on Communications*, vol. 49, No. 11, Nov. 2001, pp. 2006-2015.

Park et al., "Effect of Bluetooth interference on OFDM systems," *Electronics Letters*, Nov. 11, 2004, vol. 40, No. 23.

Taher et al., "Characterization of an Unintentional Wi-Fi Interference Device—The Residential Microwave Oven," *MILCOM 2006*, Oct. 2006, pp. 1-7.

Lee et al., "Spectral Signatures and Interference of 802.11 Wi-Fi signals with Barker Code Spreading," *New Frontiers in Dynamic Spectrum Access Networks*, 2005, DySPAN 2005, 2005 First IEEE International Symposium on Nov. 8-11, 2005, pp. 672-675.

Shin et al., "Packet Error Rate Analysis of IEEE 802.15.4 under IEEE 802.1b Interference," *Vehicular Technology Conference*, 2006, VTC 2006-Spring, IEEE $63^{rd}$, vol. 3, 2006, pp. 1186-1190.

Paruchuri et al., Interference Study of 802.11b Networks for Proactive Performance Management,: Network Operations and Management Symposium, 2006, *NOMS 2006, $10^{th}$ IEEE/IFIP*, 2006, pp. 1-4.

Zhao et al., "Simulation and Measurement of Microwave Oven Leakage for 802.11 WYLAN Interference Management," Microwave, Antenna, Propagation and EMC Technologies for Wireless Communication, 2005. *MAPE 2005*. First IEEE International Symposium on, vol. 2, Aug. 8-12, 2005, pp. 1580-1583.

Patil et al., "A Study of frequency Interference and Indoor Location Sensing with 802.11b and Bluetooth Technologies," *Wireless Telecommunications Symposium*, 2005, Apr. 28-30, 2005, pp. 174-183.

He et al., "Interference Evaluation of Bluetooth and IEEE 802.11b Systems," *Microwave and Millimeter Wave Technology*, 2004, ICMMT $4^{th}$ International Conference on Proceedings, Aug. 18-21, 2004, pp. 931-934.

Leiss, "Co-Interference between Military Radars and 802.11a WLAN Networks," *AUTOTESTCON 2003*, IEEE Systems Readiness Technology Conference Proceedings, Sep. 22-25, 2003, pp. 290-293.

Jo et al., "Performance Evaluation of Multiple IEEE 802.11b WLAN Stations in the Presence of Bluetooth Radio Interference," *Communications*, 2003 ICC '03, IEEE International Conference on, vol. 2, May 11-15, 2003, pp. 1163-1168.

Ghosh et al., "Bluetooth Interference Cancellation for 802.11g WLAN Receivers," *Communications*, 2003, ICC '03, IEEE International Conference on, vol. 2, May 11-15, 2003, pp. 1169-1173.

Borah et al., "Performance Evaluation of IEEE 802.11a Wireless LANs in the Presence of Ultra-Wideband I nterference," Wireless Communications and Networking, 2003, *WCNC 2003*, 2003 IEEE, vol. 1, Mar. 16-20, 2003, pp. 83-87.

Doufexi et al, "An Investigation of the Impact of Bluetooth Interference on the Performance of 802.11g Wireless Local Area Networks," Vehicular Technology Conference, 2003, VTC 2003-Spring. *The $57^{th}$ IEEE Semiannual*, vol. 1, Apr. 22-25, 2003, pp. 680-684.

Kato et al., "Experimental Assessment of Media Synchronization Quality in IEEE 802.11b under Bluetooth Interference," *The $14^{th}$ IEEE Proceedings on Personal, Indoor and Mobile Radio Communications*, 2003, vol. 3, Sep. 7-10, 2003, pp. 2683-2689.

Sakal et al., "Simulation of Interference between Bluetooth and 802.11b Systems," *Electromagnetic Compatibility*, 2003. EMC '03. 2003 IEEE International Symposium on, vol. 2, May 11-16, 2003, pp. 1321-1324.

Soltanian, et al., "Rejection of Bluetooth Interference in 802.11 WLANs," Vehicular Technology Conference, 20. Proceedings. VTC 2002-Fall. 2002 IEEE $56^{th}$, vol. 2, Sep. 24-28, 2002, pp. 932-936.

Chandrashekhar et al., "Evaluation of Interference Between IEEE 802.11b and Bluetooth in a Typical Office Environment," *The $12^{th}$ IEEE International Symposium on Personal, Indoor and Mobile Radio Communications*, 2001 , vol. 1, Sep.30-Oct. 3, 2001, pp. D71-D-75.

Punnoose et al., "Experimental Results for Interference between Bluetooth and IEEE 802.11b DSSS Systems," *Vehicular Technology Conference*, 2001. VTC 2001 Fall. IEEE VTS $54^{th}$, vol. 1, 2001, pp. 67-71.

Fainberg et al., "Analysis of the Interference Between IEEE 802.11b and Bluetooth Systems," *Vehicular Technology Conference*, 2001. VTC 2001 Fall. IEEE VTS $54^{th}$, vol. 2, Oct. 7-11, 2001, pp. 967-971.

Valadas, "Interference Modeling for the Simulation of IEEE 802.11 Infrared Local Area Networks," *Seventh IEEE International Symposium on Personal, Indoor and Mobile Radio Communications*, 1996, vol. 1, Oct. 15-18, 1996, pp. 257-261.

Li et al., "Co-Channel Interference Cancellation for Space-Time Coded OFDM Systems," *IEEE Trans. Wireless Communications*, vol. 2, No. 1, Jan. 2003, pp. 41-49.

Münster et al., "Parallel-Interference-Cancellation-Assisted Decision Directed Channel Estimation for OFDM Systems Using Multiple Transmit Antennas," *IEEE Trans. Wireless Communications*, vol. 4, No. 5, Sep. 2005, pp. 2148-2161.

Park et al., "Complexity-Reduced Iterative MAP Receiver for Interference Suppression in OFDM-Based Spatial Multiplexing Systems," *IEEE Trans. Vehicular Tech.*, vol. 53, No. 5, Sep. 2004, pp. 1316-1326.

Wallace et al., "Power and Complex Envelope Correlation for Modeling Measured Indoor MIMO Channels: A Beamforming Evaluation," 2003 IEEE, pp. 363-367.

Diggavi, "Communication in the Presence of Uncertain Interference and Channel Fading," Dec. 1998 Ph.D. thesis, Section 5.2.

Vogeler et al., "Blind Bluetooth interference Detection and Suppression for OFDM Transmission in the ISM band," *Thirty-Seventh Asilomar Conference on Signals, Systems and Computers*, 2003, vol. 1, pp. 703-707.

Kühn, "Iterative Interference Cancellation and Channel Estimation for Coded OFDM-CDMA," *ICC '03*. IEEE International Conference on Communications, vol. 4, May 2003, pp. 2465-2469.

Venkataraman et al., "Adaptive Beamforming for Interference Rejection in an OFDM System," *Conference Record of the Thirty-Seventh Asilomar Conference on Signals, Systems and Computers*, 2003, vol. 1, Nov. 2003, pp. 507-511.

Nallanathan et al. "Adaptive Channel Estimation and Interference Cancellation in Space-Time Coded OFDM Systems," *2004 IEEE $59^{th}$ Vehicular Technology Conference*, vol. 3, Mar. 2004, pp. 1760-1764.

Duplicy et al., "Interference-Free Multi-User MIMO-OFDM," *IEEE International Conference on Acoustics, Speech, and Signal Processing*, 2005. (ICASSP '05), vol. 3, Mar. 2005, pp. 1149-1152.

Lee et al., *CDMA Systems Engineering Handbook*, Artech House Publishers, 1998, Section 5.4, ISBN-10: 0890069905.

Ying et al., "Interference-Blocking Algorithm for OFDM Systems: Insensitive to Time and Frequency Synchronization Error," *IEEE Wireless Communications & Networking Conference (WCNC2007)*, 2007.

Ying et al., "Covariance Based Interference Blocking Algorithm for SIMO OFDM System," *IEEE Signal Processing Letters*, Mar. 2006, pp. 165-168.

Ai et al., "On the Synchronization Techniques for Wireless OFDM Systems," *IEEE Transactions on Broadcasting*, vol. 52, No. 2, Jun. 2006, pp. 236-244.

Minn et al., "A Combined Timing and Frequency Synchronization and Channel Estimation for OFDM," *IEEE Transactions on Communication*,, vol. 54, No. 3, Mar. 2006, pp. 416-422.

Mostofi et al., "Mathematical Analysis of the Impact of Timing Synchronization Errors on the Performance of an OFDM System," *IEEE Transactions on Communications*, vol. 54, No. 2, Feb. 2006, pp. 226-230.

Kim et al., "Synchronization and Channel Estimation in Cyclic Postfix based OFDM System," *IEEE $63^{rd}$ Vehicular Technology Conference*, 2006. Spring. , vol. 4, 2006, pp. 2028-2032.

Häring et al., Residual Carrier and Sampling Frequency Synchronization in Multiuser OFDM Systems, *IEEE $63^{rd}$*, Vehicular Technology Conference, 2006. Spring. vol. 4, 2006, pp. 1937-1941.

Ninh et al., "New Cyclic Prefix Based Symbol Timing and Carrier Synchronization for OFDM," *Communications*, 2006 $23^{rd}$ Biennial Symposium on, May 29-Jun. 1, 2006, pp. 198-203.

Athaudage et al., "Sensitivity of FFT-Equalised +D OFDM Systems to Time and Frequency Synchronization Errors," *Communications, IEEE Proceedings*, vol. 152, No. 6, Dec. 9, 2005, pp. 945-951.

Athaudage et al., "Sensitivity of FFT-equalized zero-padded OFDM systems to time and frequency synchronization errors," Personal, Indoor and Mobile Radio Communications, 2005, *PIMRC 2005*. IEEE $16^{th}$ International Symposium on, vol. 2, Sep. 11-14, 2005, pp. 730-734.

Herlekar et al., "OFDM Performance Analysis in Presence of Synchronization Errors Induced by Hot Carriers," *IEEE $62^{nd}$ Vehicular Technololgy Conference*, 2005, vol. 3, Sep. 25-28, 2005, pp. 1844-1848.

Zhou et al., "Sensitivity of Multiband ZP-OFDM Ultra-Wide-Band and Receivers to Synchronization Errors," *Signal Processing*, IEEE Transactions on, vol. 55, Issue 2, Jan. 2007, pp. 729-734.

Noor et al., "Subcarrier Availability in Downlink OFDM Systems with Imperfect Carrier Synchronization in Deep Fading Noisy Doppler Channels," *IEEE $64^{th}$ Vehicular Technology Conference*, 2006. Sep. 2006, pp. 1-6.

Salberg et al., "Doppler and Frequency-Offset Synchronization in Wideband OFDM," *IEEE Transactions on Wireless Communications*, vol. 4, No. 6, Nov. 2005, pp. 2870-2881.

Wang, "Synchronization Techniques for Multiple-Input Multiple-Output OFDM Systems," *2005 IEEE $62^{nd}$ Vehicular Technology Conference*, 2005, vol. 3, Sep. 25-28, 2005, pp. 1445-1449.

Duplicy et al., "Interference-Free Multi-User MIMO-OFDM," *IEEE International Conference on Acoustics, Speech, and Signal Processing*, vol. 3, Mar. 18-23, 2005, pp. iii/1149-iii/1152.

Olfat et al., "MIMO-OFDM Systems With Multi-User Interference," *IEEE International Conference on Acoustics, Speech, and Signal Processing*, 2004, vol. 2, May 17-21, 2004, pp. ii-21-4.

Armada et al., "Analysis of Phase Noise Effects in Multi-User OFDM." *First International Symposium on Control, Communications and Signal Processing*, 2004 , pp. 63-66.

Geng et al., "Multi-user MIMO-OFDM Cell Throughput under Real-World Propagation Conditions," *Vehicular Technology Conference*, 2002. Proceedings. VTC 2002-Fall. 2002 IEEE $56^{th}$.

Cheng et al., "Blind Linear MMSE Receivers for MC-CDMA Systems," *IEEE Transactions on Circuits and Systems-I: Regular Papers*, vol. 54, No. 2, Feb. 2007, pp. 367-376.

Sacchi et al., "Genetic algorithm-based MMSE receiver for MC-CDMA systems transmitting over time-varying mobile channels," *Electronics Letters*, vol. 43, No. 3, Feb. 1, 2007, pp. 172-173.

Sreedhar et al., "MMSE Receiver for Multiuser Interference Cancellation in Uplink OFDMA," *IEEE $63^{rd}$ Vehicular Technology Conference*, 2006, vol. 5, 2006, pp. 2125-2129.

Tung et al., "MMSE Receiver for Multicarrier CDMA Overlay in Ultra-Wide-Band Communications," *IEEE Transactions on Vehicular Technology*, vol. 54, No. 2, Mar. 2005, pp. 603-614.

Xia et al., "Performance Comparison of Optimum and MMSE Receivers with Imperfect Channel Estimation for VSF-OFCDM Systems," *IEEE Transactions on Wireless Communications*, vol. 4, No. 6, Nov. 2005, pp. 3051-3062.

Govindasamy et al., "Linear MMSE Receivers for Random CDMA in Wireless Networks With Equal Transmit Powers," *Conference Record of the Thirty-Ninth Asilomar Conference on Signals, Systems and Computers*, Oct. 28-Nov. 1, 2005, pp. 474-478.

Dietl et al., "Low-Complexity MMSE Receivers Based on Weighted Matrix Polynomials in Frequency-Selective MIMO Systems," *Proceedings of the Eighth International Symposium on Signal Processing and Its Applications*, vol. 2, Aug. 28-31, 2005, pp. 699-702.

Zhiwei et al., "A combined MMSE receiver for high data rate UWB systems," *Communications Systems*, 2004. The Ninth International Conference on, Sep. 6-8, 2004, pp. 1-5.

Grivel et al., "Designing Adaptive Filters-Based MMSE Receivers for Asynchronous Multicarrier DS-CDMA Systems," *$15^{th}$ IEEE International Symposium on Personal, Indoor and Mobile Radio Communications*, vol. 4, Sep. 5-8, 2004, pp. 2930-2934.

Liu et al., "Optimal Linear Code Design in Improving BER for MIMO Systems with MMSE Receivers," *$7^{th}$ International Conference on Signal Processing*, vol. 2, Aug. 31-Sep. 2004, pp. 1666-1669.

Scott et al., "Design and Performance of IEEE 802.15.4 Compliant MMSE Receivers." *Conference Record of the Thirty-Eighth Asilomar Conference on Signals, Systems and Computers*, vol. 2, Nov. 7-10, 2004, pp. 2051-2055.

Jorswieck et al., "On the Optimal Transmission Strategy for the MIMO MAC with MMSE Receiver," *IEEE International Conference on Acoustics, Speech, and Signal Processing*, vol. 5, 2003, pp. V-109-V-112.

Sabharwal et al., "MMSE receivers for Multirate DS-CDMA Systems," *IEEE Transactions on Communication*, vol. 49, No. 12, Dec. 2001, pp. 2184-2197.

* cited by examiner

METHOD AND SYSTEM FOR MULTIUSER WIRELESS COMMUNICATIONS USING ANTI-INTERFERENCE TO INCREASE TRANSMISSION DATA RATE

RELATED APPLICATIONS

This application claims the priority of U.S. Provisional Patent Application No. 60/940,330 filed May 25, 2007. This is also a continuation-in-part of U.S. patent application Ser. No. 12/123,992, filed May 20, 2008, now abandoned which is a continuation of U.S. patent application Ser. No. 11/002,161 filed Dec. 2, 2004, now issued U.S. Pat. No. 7,376,394 entitled "METHOD AND SYSTEM FOR WIRELESS COMMUNICATIONS USING ANTI-INTERFERENCE TO INCREASE DATA TRANSMISSION RATE," which claims priority to U.S. Provisional Patent Application No. 60/526,512, filed Dec. 3, 2003, all of which are hereby incorporated by reference in their entirety for everything that they describe.

FIELD OF THE INVENTION

This invention relates generally to wireless communications, and more particularly to Autocorrelation Division Multiple Access (ADMA) system and autocorrelation matching algorithms that blocks multiple access interference and co-channel interference to achieve improved channel data rate and increased number of users within limited spectrum.

BACKGROUND

Wireless communications have become a major way of communications and in many applications are replacing conventional land-based communication systems. There are many kinds of wireless communication systems, such as the cellular phone system, the wireless LAN, and the WiMAX. The most commonly used system is the cellular system, and the other wireless communication systems such as WiFi and WiMax are growing rapidly.

The users of a wireless channel may be, for instance, a cellular phone, a laptop computer, etc. Many users may share same communication channel. Therefore, they interfere with each other. A typical communication objective is for the receiver to receive the transmitting signal from a specific user with whom the receiver wants to communicate. In order to achieve this objective, multiple access systems are used. Typical multiple access systems are the Frequency Division Multiple Access technology (FDMA), the Time Division Multiple Access technology (TDMA), and the Code Division Multiple Access technology (CDMA). Each multiple access system establishes its own rules for their users and uses base stations to regulate their users to achieve this objective.

One common problem frequently encountered in wireless communications is the presence of interfering signals transmitted by devices other than the particular sender with which the receiver wants to communicate. Depending on the types of the wireless communications, interferences can be classified in many ways. It may be intentional, such as the jamming of military wireless transmissions. It may be accidental and resulting from having multiple users who are sharing a common wireless channel with or without the same base station that regulates the particular user. The interferences resulting from users with the same base station are called the multiple access interferences (MAI). All others are called the co-channel interferences. For simplicity, both interferences are lumped into one word interferences.

The presence of interferences can severely compromise the ability of the receiver to discern the signal from the intended sender, resulting in a significant reduction of the channel data rate for the wireless transmissions from the sender to the receiver. In the cellular system, multiple access systems have been used to combat the multiple access interference with the support of a base station. The three commonly used multiple access technologies are the FDMA, the TDMA, and the CDMA. In FDMA, the users are assigned non-overlapping frequency slots (by the base station), and hence the multiple access interference can be avoided. Similarly, in TDMA the users are assigned non-overlapping time-slots, and in CDMA users are assigned 'non-overlapping' orthogonal codes. Because of the power limitation of the base station, the area of the cell it controls is limited to its neighborhood. Therefore, any user outside the cell can not be controlled by this base station, and hence may interfere with the users in the cell.

Interferences in wireless transmissions are also a serious issue for Wireless Local Area Network (LAN). A wireless LAN uses part of the frequency spectrum that is free to everybody and hence it costs nothing to use the spectrum. It uses the internet to reach the outside world and hence it again costs nothing. However, the interferences between the users can be significant because this part of spectrum is unregulated. This is one of the major challenges for wireless LAN. The current technology confines it to be in a local area with limited users. It does not allow it to be developed to reach its full commercial potential value. WiFi is one kind of Wireless LAN and hence shares the same advantages and challenges. Interferences between the users also exist in ad hoc network, a closed wireless communication network but without a based station for central command.

The number of users that is allowed within a fixed spectrum is also limited by the interference. Each company is assigned a total spectrum for its exclusive use. According to its multiple access system, the total spectrum is then divided into a number of "personal spectrums". These personnel spectrums are preferred to be non-overlapping so that there are no interferences between users. This limits the number of users that is allowed within a fixed spectrum. However, higher data rate would demand a wider personal spectrum for the users. This could cause serious interferences between the users because of the heavy overlapping of their personal spectrums. Therefore, an effective way of blocking these interferences would have the potential of increasing the number of users within a fixed spectrum.

In view of the foregoing, there is a vital need for a way to effectively counter the negative effects of interfering signals and to enhance the channel data rate of wireless communications between a sender and a receiver in the presence of interfering signals, and to increase the number of users within a fixed spectrum.

With the thirst of ever increasing higher data rate by demand, the current multiuser wireless communications systems have difficult to fulfill the challenge for future generations of multiple access systems. For example, the required data rate for digital voice is less than 64 Kbps, Standard Digital TV (SDTV) is 3-6 Mbps, and High Definition TV (HDTV) is 18-24 Mbps. On the other hand, the data rate of 2 G cellular system is about 140 kbps that is enough to support digital voice and text transmission. The 3 G standards call for data rates up to 2 Mbps which can support the transfer of SDTV. Future wireless data applications such as broadband Internet access, interactive 3D gaming, and high quality audio and video entertainment, each of them may require a date rate of 1-5 Mbps, which is much higher than current cellular phone system can provide.

The invention of the specific MIMO multiple access system described in this patent application can reduce substantially the interferences at the receiver and hence increases significantly the channel data rate, without the increase of spectrum bandwidth. A positive consequence of this is the increase of number of users within a fixed spectrum.

BRIEF SUMMARY OF THE INVENTION

The presented invention provides a multiple access system and algorithms, called the Autocorrelation Division Multiple Access system (ADMA) and ADMA Algorithms, which substantially block interferences at the receiver; thereby allowing the channel data rate to be significantly improved. This multiple access system and the algorithms provide an implementation of the Noise-Transparent Autocorrelation Matching Analysis given in U.S. Pat. No. 7,367,394.

In the invention of ADMA System, the signal of each user is encoded with a unique code, called the ADMA code. The coded signal, called the ADMA signal, is used for the transmission through the wireless channel to the receiver from one or more transmitting antennas. The receiver receives a plurality of input signals by using, for example, two or more receiving devices (e.g., antennas or smart antennas). Each received signal contains a signal component that is from the designated user signal corresponding to wireless transmissions from an intended sender, and an interference component that is from one or more interferences corresponding to wireless transmissions from other users (i.e. multiple access interference) and/or to co-channel interference sources. The signal component is then extracted from the received signals by a filter, called the ADMA Filter, by which the interference component is substantially blocked. This is possible because the filter is designed to be orthogonal to the channel vectors of interferences. In this invention the ADMA filter is obtained without the knowledge of the channel vectors of interferences which sometimes are neither known to the receiver nor can be accurately estimated using pilot signal techniques under heavy interferences. Finally, the designated signal is recovered from the signal component by a decoder, call the ADMA decoder.

According to the invention, the ADMA filter is derived in the following way: Each user signal is first coded with a unique ADMA code. Then the coded signal is used to be transmitted through the channel. The Noise-Transparent Autocorrelation Matching Analysis is then implemented at the receiver by applying specially designed algorithms to the unique ADMA code assigned to the designated signal, by which the ADMA filter is obtained. The filter obtained is of a high degree of accuracy because the accuracy is not compromised by the noise. The algorithms and the ADMA codes are part of the invention.

DETAILED DESCRIPTION OF PREFERRED EMBODIMENTS

I. Description of the ADMA Systems

Figure 1:
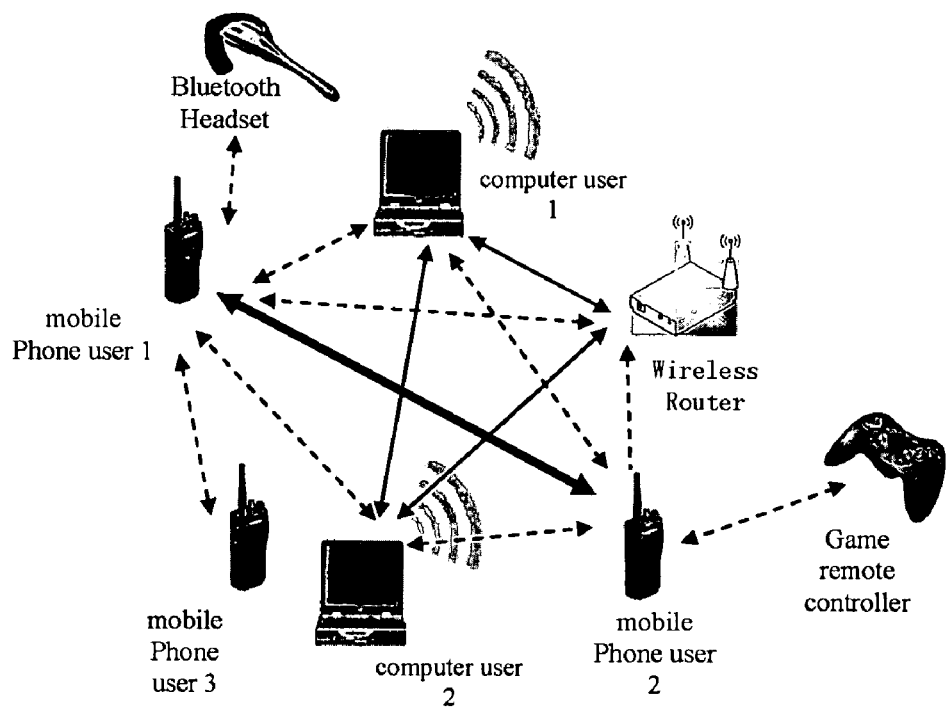
FIG. 1 is a scenario of the wireless communications. The wireless LAN system is represented by the computer users 1 and 2 and the wireless router. The mobile system is represented by the mobile phone users 1, 2, 3, and a base station not shown in the Figure. Any two users can communicate with each other via the wireless router, the base station (not shown) or via the internet (not shown). Besides the mobile phone system and wireless LAN system, the same spectrum is also shared by Bluetooth and remote controller users. These users cause co-channel interference to the mobile phone and wireless LAN systems. The communication between any pair can be interfered by other users.

The ADMA System has the potential to be used to almost all wireless system, such as cellular systems, wireless LAN, and ad hoc systems. In FIG. 1, the mobile system is represented by mobile phone user 1, 2, 3, and a base station (not shown). Any two mobile users can communicate with each other via the base station. The Ad Hoc system is represented by mobile user 1, 2, and 3 but without base station. The wireless LAN system is represented by two computer users 1, 2 and the wireless router. Any two computer users can communicate with each other via the wireless router. Any communication between a pair of users (the solid line) can be interfered by any other user (dotted line) including Bluetooth user and remote controller user.

A cellular system is a closed mobile system that operates in a (private) licensed spectrum. No other user without the license can operate in this spectrum. Therefore the interference from outside of the system can be kept to a minimum. However, limited spectrum put a limit on the number of users to be operated at the same time. Any extra users would become interferences to others. Therefore, one way to increase the number of users beyond this limit is to have a new multiple access system that can reduce these interferences.

From another point of view, wireless communication in the unlicensed spectrum such as in 2.4 GHz, where is operated by wireless LAN, Bluetooth, wireless remote controller and microwave oven. All these systems can operate in this spectrum without a license. Therefore, interferences can be a major concern which put a direct impact to the data rate. It is needed to have a new multiple access system that can reduce these interferences.

ADMA is a multiple access system that substantially reduces the interference and hence increases the number of users in the licensed spectrum and increases the date rate in the unlicensed spectrum. ADMA can be implemented by one or more computer processors. The instruction can be stored on a computer readable medium such as hard drive or flash memory.

Figure 2:
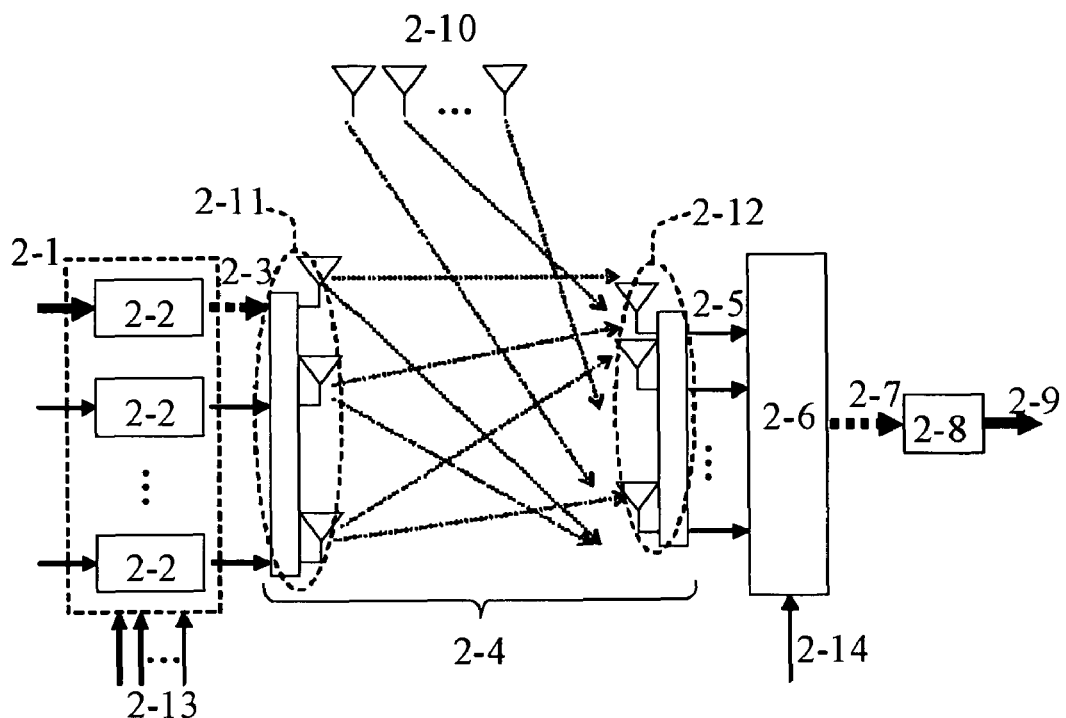
FIG. 2 is the schematic diagram of the ADMA System, showing an embodiment of the invention in which the channel data rate of wireless communications between a sender and a receiver is enhanced by an ADMA filter that blocks interference signals in accordance with the invention.
Figure 4:
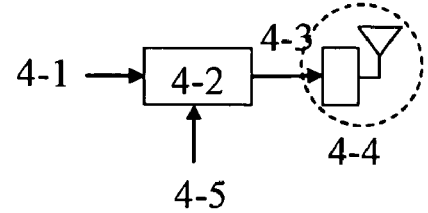
FIG. 4 is the schematic diagram of the ADMA transmitter showing an embodiment of the invention in which the user signals are coded by ADMA encoder to make them ADMA signals that is used to be transmitted into the channel in accordance with the invention.
Figure 5:
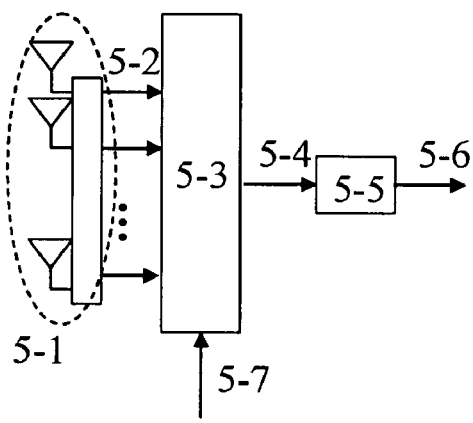
FIG. 5 is the schematic diagram of the ADMA receiver showing an embodiment of the invention in which the component of interferences of the received signals is blocked by the ADMA Filter to give the component of the signal from which the desired user signal is obtained by the ADMA Decoder, in accordance with the invention.

1. The Architecture of ADMA System:

By invention, the architecture of the Autocorrelation Division Multiple Access system (ADMA) is shown in FIG. 2. It consists of the ADMA Transmitter (2-2 and 2-11; also, 4-2 and 4-4 in FIG. 4), the ADMA Receiver (2-12, 2-6, and 2-8; also 5-1, 5-3, 5-5 in FIG. 5) and the wireless channel (2-4). The ADMA Transmitter consists of the ADMA Encoder (2-2; also 4-2 in FIG. 4) and the multiple-antenna transmitting system (2-11; also 4-4 in FIG. 4). The ADMA Receiver consists of the multiple-antenna receiving system (2-12; also 5-1 in FIG. 5), the ADMA Filter and the Control Module (2-6; also 5-3 in FIG. 5), and the ADMA Decoder (2-8; 5-5 in FIG. 5). The ADMA Filter and its Control Module is imbedded in (2-6) for FIG. 2, and described in detail in FIG. 3 as (3-2) and (3-4) respectively.

The autocorrelation of a signal u(t), denoted by $\rho_u(\tau)$ is a sequence of numbers that is uniquely determined by the signal itself. Mathematically, it is defined by $$\rho_u(\tau) = Ex\{u(t)u^*(t-\tau)\}, \text{ for } \tau = 0, 1, 2, \ldots$$

where u* is the complex conjugate of u, Ex{ } is the expectation operator, and $\tau$ is called the time-lag variable of the autocorrelation. The significance of the autocorrelation of a signal is that it carries the information of the power distribution of the signal in the frequency spectrum.

Noise signal n exists everywhere and it is a major handicap for wireless communication. The distribution of noise signal is white and Gaussian with variance $\rho_n^2$. Therefore, its autocorrelation, denoted by $\rho_n$ has the property that $$\rho_n(\tau) = \begin{cases} \sigma_n^2 & \text{for } \tau = 0 \\ 0 & \text{for } \tau > 0 \end{cases}$$

Note that the autocorrelation of noise is zero on the set of time-lag variables, $\tau>0$, or $\tau=1, 2, \ldots$. This set of time-lag variables is called the noise-transparent set because the autocorrelation of noise is zero on this set. We will later show as an invention how the computation of the ADMA filter is performed on the noise-transparent set and hence the accuracy of the computation is not much compromised by the noise.

2. The ADMA Transmitter

The ADMA Transmitter first assigns each user a unique identification number, called the ADMA code. By invention, these ADMA codes are specially designed and the Natural code, the Pairwise Linearly Independent code and the Zero-Block code are presented. The next objective of the ADMA transmitter is to transform each user signal to a coded signal, called the ADMA signal in such a way that the autocorrelation of the coded signal is the same as the respective ADMA code on the noise-transparent set of time-lag variables. These ADMA signals are then transmitted by the multiple-antenna transmitting system to the wireless channel.

Each user signal is fed into a respective encoder, called the ADMA encoder (2-2). The ADMA encoder transforms the user signal into a coded signal, called the ADMA signal. By invention, the ADMA encoder is designed in such a way that the autocorrelation of the ADMA signal on a noise-transparent set is the same as the ADMA code assigned to the respective user. Therefore, each ADMA signal carries an identification number in the form of ADMA code, and these ADMA signals are then transmitted by the multiple-antenna transmitting system (2-11) into the wireless channel (2-4). Based on these ADMA codes, the receiver is able to identify the ADMA signals.

Among the user signals, one of them is the designated one (heavy 2-1) that is the one the receiver intends to communicate with. Correspondingly, the designated ADMA signal is then transmitted together with other ADMA signals through the wireless channel (2-4). The co-channel interferences (2-10) are then mixed with these ADMA signals in the wireless channel.

3 The ADMA Receiver

In the receiving side, at least two received signals (2-5) are received by multiple-antenna (at least two) receiving system (2-12). Each of the received signals (2-5) is a mixture of ADMA signals, the co-channel interferences (2-10) and the noise (not shown). One of the ADMA signals is the designated one. These received signals are then fed into the receiver of ADMA. The function of the receiver is to isolate the desired user signal from other user signals and co-channel interferences by implementing the Noise-Transparent Autocorrelation Matching Analysis on the multiple received signals as shown in U.S. Pat. No. 7,376,394.

The receiver of ADMA contains at least four components: the multiple receiving antennas (2-12), the ADMA Filter (3-2), the Control Module (3-4) and they are all limped in (2-6), and the ADMA decoder (2-8).

Figure 3:
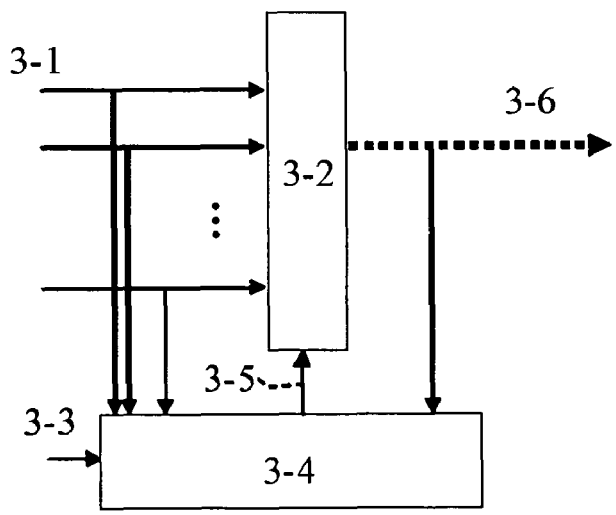
FIG. 3 is the schematic diagram of the ADMA Filter and its Control Module, showing an embodiment of the invention in which the interference component of the received signal (3-1) is substantially blocked by the ADMA Filter at the receiver in accordance with the invention.

There are at least two received signals from at least two antennas. Each received signal is a mixture of all the ADMA signals and the co-channel interferences. As shown in FIG. 3, all these received signals (3-1) are fed into a filter, called the ADMA Filter (3-2). The output (3-6) of ADMA Filter is a weighted sum of these received signals (3-1). The objective of the ADMA Filter is to assign proper weights to the incoming received signals, in such a way that all signals other than the designated ADMA signal are essentially cancelled and only the designated ADMA signal is retained essentially in the output of the ADMA filter.

The function of the Control Module (3-4) of the ADMA Filter is to compute and instruct (3-5) the ADMA filter (3-2) its proper weight. This is achieved by the invention ADMA algorithm to match the autocorrelation of the output signal of the filter to the designated ADMA code on the noise-transparent set, with the information of the input signals (3-1) and the output signal (3-6) of the ADMA Filter and the ADMA code of the designated users (3-3) As such, based on the U.S. Pat. No. 7,367,394 on Noise-Transparent Autocorrelation Matching Analysis, the proper weight of the ADMA Filter is computed and its accurately is not much compromised by the noise. Consequently, all the ADMA signals other than the designated ADMA signal and the co-channel interferences are substantially blocked. Hence, the output of the ADMA Filter consists of essentially the designated ADMA-signal (2-7).

This designated ADMA signal is then fed into the ADMA decoder (2-8). The function of ADMA decoder is to perform the inverse of the ADMA encoder. Therefore, with the designated ADMA signal as its input, its out is essentially the designated user signal (2-9).

4. Multi-User System with ADMA Transceivers

Figure 6:
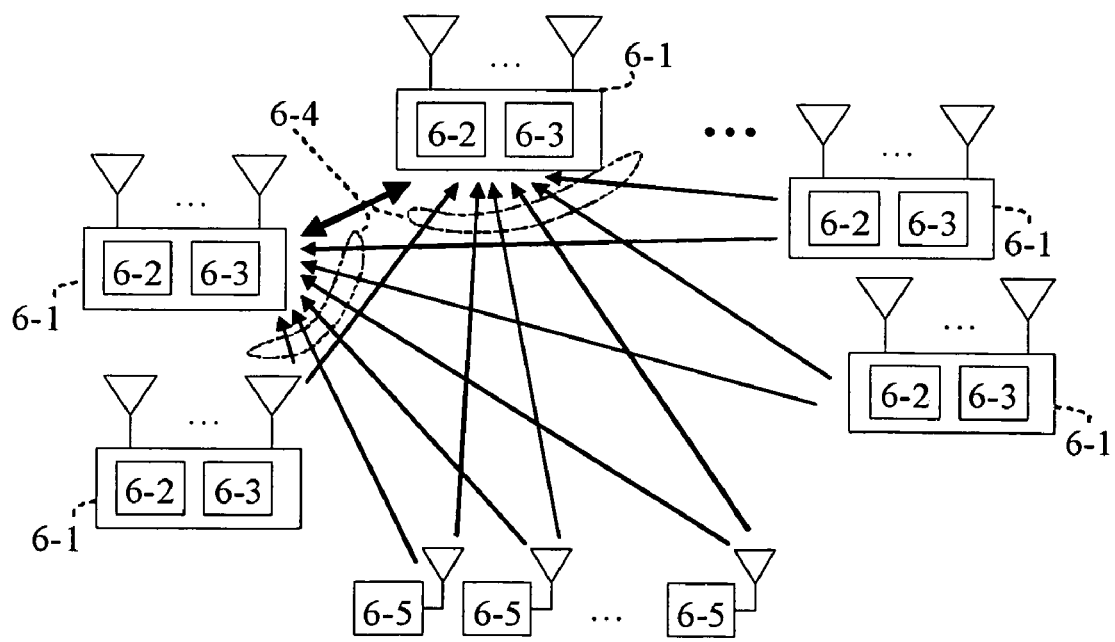
FIG. 6 provides an illustration on how multiple ADMA transceivers may be positioned with respect to each other and to co-channel interferences in a typical multi-user wireless system.

A typical implementation of ADMA is illustrated in FIG. 6. In the closed multi-user system, each user uses an ADMA transceiver (6-1). Each ADMA transceiver is assigned an ADMA code known to all the transceiver in the closed system. There is an ADMA transmitter (6-2) and an ADMA receiver (6-3) built in the transceiver. The co-channel interferences are transmitted from separate sources (6-5). The communication between any two users (transceivers) is represented by the heavy double header arrow, while the interferences from other users (multiple access interference) and co-channel interferences are represented by solid arrows. By using of the ADMA transceivers, the communication between any two users will have little interferences.

II. Components of ADMA Systems

The invention Autocorrelation Division Multiple Access system (ADMA) is a multiple access system that includes (1) ADMA Code, (2) ADMA Encoder, (3) ADMA Filter, (4) Control Module of ADMA Filter, and (5) ADMA Decoder. The combination of them creates an implementation of the noise-transparent Autocorrelation Matching Analysis, in the following manner. At the transmission side, as an invention all transmitting signals are ADMA signals each of which carries the identification, or the ADMA code of the respective user signal. At the receiving side, the received signals from the multiple-antenna receiving system are the input to the ADMA Filter. Based on the invention, this filter is adjusted and determined by its Control Module in such a way that the autocorrelation of the output of the filter matches the designated ADMA code on a noise-transparent set of time lag values. Based on U.S. patent application Ser. No. 11/002,161 on noise-transparent Autocorrelation Matching Analysis, the ADMA Filter substantially removes the interference components from the received signal.

In the following, as an illustration of the general method, some of the ADMA codes, their ADMA matching algorithms and their ADMA encoder/decoder are given. As an invention, the ADMA codes given below has the property that the weights of ADMA Filter can have a closed form solution computed by ADMA algorithms. The first ADMA system is given below:

(1) The Natural ADMA Code (2-13)

Each user who accesses the ADMA system is assigned a unique identification number, called the ADMA code (2-13). An ADMA code C is a sequence of say K numbers, represented by $$C = (c_1, c_2, \ldots c_k)$$

For N number of users (2-1), there will be N number of ADMA codes, represented by $$C_i = (C_{i1}, c_{i2}, \ldots, c_{iK}), i=1, 2, \ldots, N$$

where $C_i$ represents the ADMA code for the $i^{th}$ user. The design of ADMA codes is unique.

As an invention, the natural ADMA codes is first presented here, $$C_1 = (1, 0, 0, \ldots, 0)$$
$$C_2 = (0, 1, 0, \ldots, 0)$$
$$\vdots$$
$$C_N = (0, 0 \ldots, 0, 1)$$

The $i^{th}$ user is assigned the $i^{th}$ ADMA code $C_i$.

(2) ADMA Encoder (2-2) for Natural ADMA Codes

In order to achieve a better data rate, the user signals are usually chosen to be white with unit variance.

Figure 7:
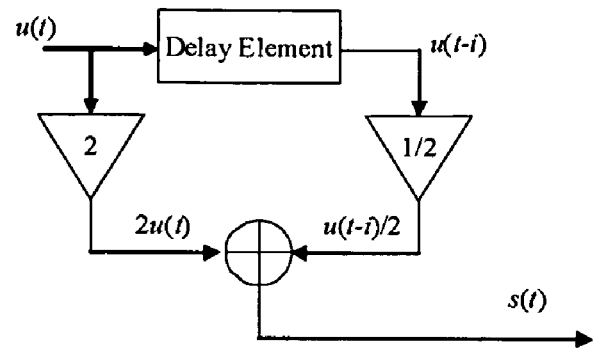
FIG. 7 is the ADMA Encoder for Natural ADMA Code implemented by a Feedforward Shift Register

As an invention, the ADMA encoder is designed to transform the user signal to an ADMA signal the autocorrelation of which is the same as the ADMA code of the user signal on the noise-transparent set. Specifically, the $i^{th}$ ADMA Encoder (2-2) for natural ADMA codes is a shift register as shown in FIG. 7. The input signal to the shift register is the $i^{th}$ user signal $u_i$ and the output signal $s_i$ of the shift register is the ADMA signal for the $i^{th}$ ADMA encoder. The mathematical relation between the two is given by $$S_i(t) = 2u_i(t) + \frac{1}{2}u_i(t-i)$$

It can be shown that for any user signal $u_i$, the autocorrelation of the output signal $s_i(t)$, denoted by $\rho_{s_i}(\tau)$ is the same as the $i^{th}$ natural code $C_i$ on the noise-transparent set, i.e., for $\tau=1, 2, \ldots$ $$\rho_{s_i}(\tau) = \begin{cases} 1 & \text{for } \tau = i \\ 0 & \text{for } \tau \neq i \end{cases}$$

So, the $i^{th}$ ADMA Encoder converts any $i^{th}$ user signal to an ADMA signal of which the autocorrelation is the same as the $i^{th}$ ADMA code.

(3) ADMA Filter (3-2)

From the received signals x (3-1), the objective of ADMA filter w (3-2) is to compute in its output y (3-6) a weighed sum of the received signals by $$y(t) = w^H x(t) = w_1 x_1(t) + w_2 x_2(t) + \ldots + w_L x_L(t)$$

where $(x_1, x_2, \ldots, x_L)$ are the L number of received signals and $(w_1, w_2, \ldots, w_L)$ are the L number of weights that are to be designed. Each received signal $x_i(t)$ is a mixture of the ADMA signals and co-channel interferences. A proper weight is one that yields in the weighted sum $y(t)$ essentially the designated ADMA signal.

(4) Control Module of ADMA Filter (3-4)

The essential objective of the Control Module (3-4) is to compute the proper weight of the filter. Based on the U.S. patent application Ser. No. 11/002,161 on Noise-Transparent Autocorrelation Matching Analysis, this is achieved by computing the weight w so that the autocorrelation of the filter output signal y(t) is the same as the ADMA code on the noise-transparent set.

As an invention, the computation of the proper weight is given in following steps. First, find a matrix R that contains all the information concerning all the interferences but not the designated user. Then, find the proper weight w such that Rw=0.

Let the first user be the designated user.

1. From the receiver signal x(t) (3-1), compute the matrix R, by the Equation shown below $$R = \sum_{k=2}^{N} Ex\{x(t)x^H(t-k)\}$$

Note that the case k=1 is omitted from the summation because the first user is the designated user. The matrix R contains all the auto- and cross-correlations of all the interference signals, but not that of the designated user.

2. The proper weight w is found by the equation $$Rw=0$$

Therefore, all the auto- and cross-correlations of all the interference signals are eliminated by the filter w, but not that of the designated user. The filter w is derived as follows. Do singular value decomposition (SVD) on the matrix R, i.e., $$R = [U_1 U_2] \begin{bmatrix} \Lambda_{11} & 0 \\ 0 & 0 \end{bmatrix} \begin{bmatrix} V_1^H \\ V_2^H \end{bmatrix}$$

where $V_2 \in C^{L \times L-(M+N-1)}$. Then Construct the filter by $$w = \alpha V_2 z$$

for any $z \in C^{L-(M+N-1)}$, where $\alpha = ((V_2 z)^H R_x(\tau_1)(V_2 z))^{-1/2}$. It can be shown that any filter w so constructed provides the proper weight. As such, the output of the filter is essentially the designated ADMA signal.

When the solution w in Step 2 is not unique, choose the best solution according to some criterion, such as the maximum signal-to-noise ratio.

(5) ADMA Decoder (2-8)

Figure 8:
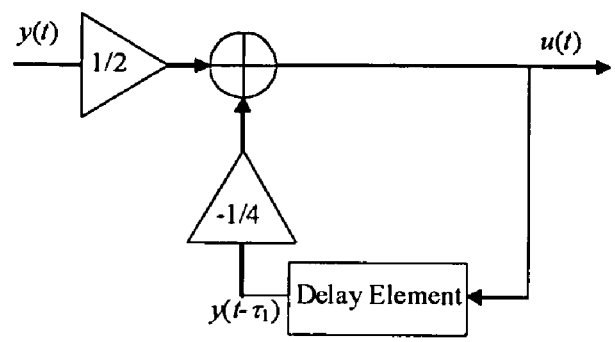
FIG. 8 is the ADMA Decoder for Natural ADMA Code implemented by a Feedback Shift Register.

As an invention, the ADMA Decoder performs the inverse of the ADMA encoder. The ADMA decider for Natural code is a shift register as shown in FIG. 8. Mathematically, it can be represented by the equation, $$\hat{u}_1(t) = \frac{1}{2} y(t) - \frac{1}{4} \hat{u}_1(t - \tau_1)$$

where the input of this decoder is the output signal of the filter y and its output is denoted by $\hat{u}_1$, which is the estimation of the designated user signal $u_1$. It can be shown that when the input signal is the designated ADMA signal, its output is essentially the designated user signal.

It can be shown that the ADMA system with Natural ADMA code, so are the ones given below, satisfies the conditions for the noise-transparent Autocorrelation Matching Analysis. Therefore, the ADMA filter substantially removes the interference component from the received signal.

III. Alternative Implementation of ADMA Systems

As an invention, two families of ADMA codes are given here. They are (A) the Pairwise Linearly Independent ADMA code and (B) the Zero-Block ADMA code. As an invention, they can be encoded by either the Shift Register Method or the Insertion Method, followed by specially designed ADMA algorithm and decoded respectively by Feedback Shift Register method or the Deletion method.

There are alternative ADMA codes other than the natural ADMA code. Two of them are given in here as part of the invention. They are the Pairwise Linearly Independent (PLI) ADMA code as the ones given in (A) and (B), and the zero-block code as the one given in (C). There are also different ways to encode a user signal to give a specified ADMA code. Two methods are given here. They are (A) the Shift Register method and (B) the Signal Insertion method. There are also different ways to decoder a specific ADMA signal to give the user signal. The Inverse Shift Register method is used to decode the ADMA signals obtained by the Shift Register method, and the Signal Deletion method is used to decode the ADMA signals obtained by the Signal Insertion method.

A: The Pairwise Linearly Independent (PLI) Codes (1) ADMA Codes (2-13)

As an invention, the family of pair-wise linearly independent (PLI) ADMA code is presented. Consider a set of ADMA codes in the general form $$C_i = (c_{i1}, c_{i2}, \ldots, c_{iK}) \text{ for } i = 1, 2, \ldots, N$$

where K is the length of the code. The set of codes is pair-wise linearly independent (PLI) if no two codes in the set of N ADMA codes are linearly dependent. This is a very large family of codes. Almost any arbitrarily chosen set of codes is PLI. The natural code is a special case of PLI code. Once a specific PLI code is chosen, assign a unique ADMA code to each user.

(2a) ADMA Encoder-Shift Register (2-2)

Figure 9:
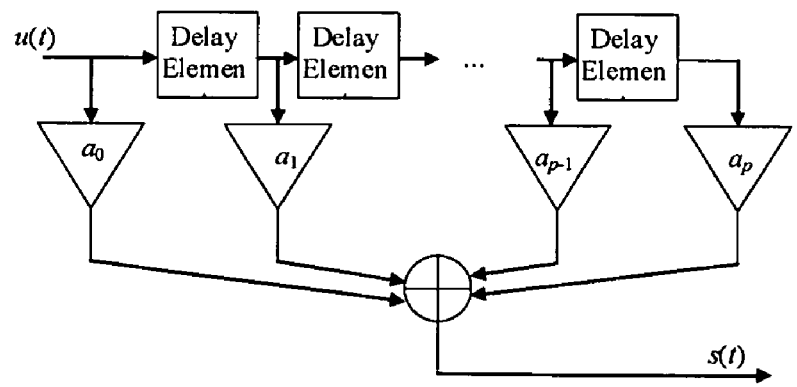
FIG. 9 is the Feedforward Shift Register in the general form to be designed for the ADMA Encoder for a PLI ADMA code.

Given an ADMA code, there are many ways to design an ADMA encoder. One way is to design a shift register to fulfill the purpose of ADMA encoder. The general form of shift register is shown in FIG. 9. The input of the shift register is the user signal u(t) and its output is denoted by s(t). The mathematical relation for the general shift register is given by, $$s(t) = \alpha_0 u(t) + \alpha_1 u(t-1) + \ldots + \alpha_P u(t-P)$$

As an invention, the coefficients $(\alpha_0, \alpha_1, \ldots, \alpha_P)$ of the Shift register is chosen so that the autocorrelation $\rho_s(\tau)$ of the output s(t) is the same as the given ADMA code $$C = (c_1, c_2, \ldots, c_K)$$

on a noise-invariant set of time-lag variables, i.e., $\rho_s(\tau) = c_\tau$ for $\tau = 1, 2, \ldots K$. As such, the shift register converts the user signal to its ADMA signal. Such ADMA encoder exists because the shift register that implements the natural codes given in FIG. 7 is a special case.

(2b) ADMA Encoder—Insertion Method

For a given ADMA code, $C = [c_1 \ c_2 \ \ldots \ c_K]$, the ADMA encoder requires the autocorrelation $\rho_s(\tau)$ of the ADMA signal s(t) to match the code words of the ADMA code on the noise-transparent set, i.e., $\rho_s(i) = c_i$ for $\tau = 1, 2, \ldots, K$.

In a more general setting, the matching criterion of the ADMA encoder can be applied on a selected noise-transparent set $\tau = \tau_1, \tau_2, \ldots, \tau_K > 0$. For example, the set can be a set of odd numbers $\tau = 1, 3, 5, \ldots, L$, or a set of even numbers $\tau = 2, 4, 6, \ldots, L$. In this more general setting, the ADMA encoder requires the autocorrelation $\rho_s(\tau)$ of the ADMA signal s(t) to match the code words of the ADMA code on the selected noise-transparent set, i.e., $\rho_s(\tau) = c_i$ for $\tau = \tau_1, \tau_2, \ldots, \tau_K$.

As an invention, the Insertion method for the ADMA encoder is presented in the more general setting. Given an ADMA code $C = [c_1 \ c_2 \ \ldots \ c_K]$, the objective of Insertion method is to insert more code words into the user signal u(t) in such a way that the autocorrelation of the resulting signal s(t) is the same as the ADMA code at a selected time-lag variables on the noise-transparent set $\tau = \tau_1, \tau_2, \ldots, \tau_K \geq 0$, i.e. $\rho_s(\tau_j) = c_j$ for $j = 1, 2, \ldots, K$.

As part of the invention, a particular insertion sequence for the insertion method is presented here. We first construct a sequence $d^T = [d_1 \ d_2 \ldots d_K]$, whose circular convolution at the time-lag variables $1, 2, \ldots, K$ is the same as a given ADMA code C in the following way, Step 1 From the given ADMA code C, construct a vector $\tilde{c}$ by inserting a reflecting image of C as shown $$\tilde{c} := [\ A \vdots c_1 \quad c_2 \quad \ldots \quad c_K \vdots c_K^* \quad \ldots \quad c_2^* \quad c_1^*\ ]$$

where A is a positive value that satisfies $$A \geq 2\sum_{k=1}^{K}|c_k|,$$

and $\alpha^*$ denote the complex conjugate of $\alpha$.

Step 2 Take discrete Fourier transform of $\tilde{c}$, i.e.

$$\tilde{c}_F := DFT(\tilde{c})$$

Step 3 Construct the vector $d_F$ whose elements are square roots of respective elements of $\tilde{c}_F$.

Step 4 Calculate inverse discrete Fourier transform of $d_F$, i.e. $d:=IDFT(d_F)$.

It can be shown that the circular convolution at the time-lag variables 1, 2, ..., K is the same as a given ADMA code C Step 5 We now insert the sequence d alternatively into a given user signal u(t) in the following way: insert the first element of d between the $1^{st}$ and the $2^{nd}$ position of u(t), the second element of d between the $2^{nd}$ and $3^{rd}$ position of u(t), and so on until all elements of d exhausted. Then repeat the above to the end of user sequence. The resulting sequence is the ADMA signal s(t) in the general setting on a selected noise-transparent set for $\tau_k=2$ k. It can be verified that $$\rho_s(\tau_j) = Ex\{s(t)s^*(t-\tau_j)\} = \frac{c_j}{4(K+1)}$$

for j=1, 2, ..., K, i.e., the autocorrelation $\rho_s$ of the ADMA signal s(t) at the even number of noise-transparent set $\tau_j=2j$ is same as the $j^{th}$ code word of the ADMA code, $c_j$, by a constant factor $$\frac{1}{4(K+1)}.$$

(3) ADMA Filter (3-2)

The ADMA Filter for the PLI codes is same one as that for the Natural Codes (4) Control Module of ADMA Filter (3-4)

As an invention, we present the ADMA algorithm for the ADMA signals on the selected noise-transparent set $\tau=\tau_1, \tau_2, \ldots, \tau_K$. Let the designated user be the first user. The ADMA Filter for the designated ADMA signal $s_1$ is computed by the following steps:

1 From the receiver signal x(t)(3-1), compute the covariance matrix $R_x$, i.e.

$$R_x(\tau) = Ex\{x(t)x^H(t-\tau)\} \text{ for } \tau=\tau_1, \tau_2, \ldots, \tau_K$$

2 Find the null-space of the designated ADMA code, $C_1^T := [c_{11} \ C_{12} \ldots C_{1K}]^T$ in the following way. Use the SVD algorithm to find the singular value decomposition of $$C_1^T = U \begin{bmatrix} \|C_1^T\|_2^2 \\ 0 \\ \vdots \\ 0 \end{bmatrix}$$

where U is an unitary matrix. Decompose $$U = [u_1 \vdots U_2]$$

where $u_1$ is the first column of U and $U_2$ consists of the remaining columns.

3 Project the ADMA codes other than the designated one, $C_i^T$, $i \neq 1$, on the null space of the designated ADMA code $C_1^T$ obtaining $p_i$, for $i \neq 1$ $$p_i := U_2(U_2^H U_2)^{-1} U_2^H C_i^T \text{ for } i=2, 3, \ldots N$$

4 Construct the matrix R by:

$$R := \begin{bmatrix} \sum_{k=1}^{K} p_{2,k}^* R_x(\tau_k) \\ \sum_{k=1}^{K} p_{3,k}^* R_x(\tau_k) \\ \vdots \\ \sum_{k=1}^{K} p_{N,k}^* R_x(\tau_k) \end{bmatrix}$$

where $p_{i,k}^*$ denotes the conjugate of the $k^{th}$ element of $p_i$. The matrix R has the property that the elements of covariance matrix of the designated user for $\tau=\tau_1, \tau_2, \ldots, \tau_K$ are not included, and information of the auto- and cross-correlation matrices of the interferences are kept.

5 Calculate a vector w that satisfies

Rw=0

It can be shown that the vector w is the ADMA filter for the designated ADMA signal.

(5) ADMA Decoder (2-8)

Figure 10:
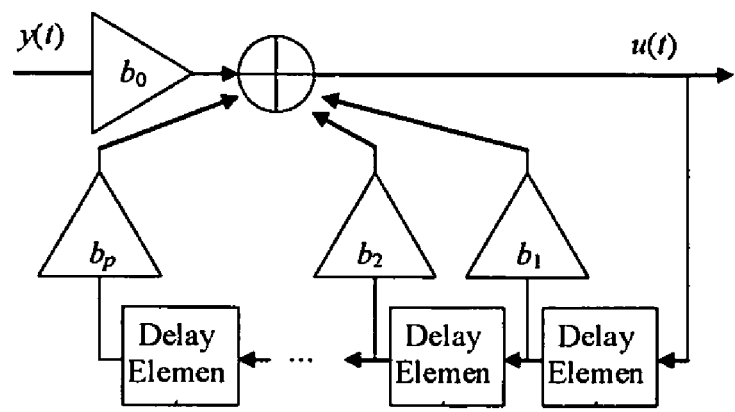
FIG. 10 is the Feedback Shift Register in the general form to be designed for the ADMA Decoder for a PLI ADMA code.

(5a) The ADMA Decoder for the Shift Register Method is a feedback Shift Register. The general form of feedback shift register is shown in FIG. 10. The input to the feedback shift register y(t) is the output of the ADMA filter. The output signal $\hat{u}(t)$ of the feedback shift register is given by $$\hat{u}_1(t) = b_0 y(t) + b_1 \hat{u}_1(t-1) + b_2 \hat{u}_{12}(t-2) + \ldots + b_P \hat{u}_1(t-P)$$

In order for the feedback shift register to be the ADMA encoder, the coefficients $(b_0, b_1, \ldots, b_P)$ have to be designed so that it performs the inverse function of the ADMA encoder. Therefore, when the input is the ADMA signal, its out should be the user signal. The feedback shift register given in FIG. 8 for the natural code is a special case.

The ADMA decoder for the Insertion method is simply by deleting some code word from the output of the ADMA Filter s(t). In particular, the user sequence u(t) can be obtained from $s_i(t)$ by simply deleting the inserted symbols of d at positions 2, 4, 6, ... The attraction of the Insertion Method is the simplicity of the decoder.

B: The Zero-Block ADMA Code (1) Zero-Block ADMA Code (2-13)

As an invention, a zero-block code is presented here. Consider a set of N number of codes in the general form, $$C_i = (c_{i1}, c_{i2}, \ldots, c_{iK}) \text{ for } i1, 2, \ldots, N$$

where K is the code length. A zero-block code is obtained by assigning each code, say the $i^{th}$ code a zero-block $I_i$ and non-zeroes elsewhere in the code, i.e., $$c_{ij} \begin{cases} = 0 & \text{for } j \in I_i \\ \neq 0 & \text{for } j \notin I_i \end{cases}.$$

The zero-blocks are not necessarily continuous. Further, the zero-blocks satisfy the overlapping rule that every zero-block overlaps with the non-zero blocks of another, i.e., $I_i \cap \bar{I}_j \neq \phi$ for every $i \neq j$. The natural code is a special case of zero-block code. The advantage of zero-block code is in the simplicity of its ADMA algorithm.

(2) ADMA Encoder (2-2)

The ADMA encoder for the zero block codes can be either the Shift Register Method or the Insertion Method.

(3) ADMA Filter (3-2)

The ADMA filter for the zero-block code is the same as the one for Natural code.

(4) Control Module of ADMA Filter (3-4)

The Control Module for Zero-Block code is the same as the one for PLI code, except that the matrix R is computed by the equation below $$R = \sum_{i \in I_1} Ex\{x(t)x^H(t - \tau_i)\}$$

The advantage of the zero-bloc code is the simplicity of the ADMA Algorithm.

(5) ADMA Decoder (2-8)

The ADMA decoder for the zero-block code is the same as that for the PLI code.

We claim:

1. A method of transmitting data in a multiple access communications network, the method comprising:
   generating a unique autocorrelation division multiple access (ADMA) code, from a set of ADMA codes such that no pair in the set are linearly dependent, for reducing interference in a data transmission to at least one user device connected to the multiple access communications network;
   sending the unique ADMA code for the user device from a transmitter to a receiver;
   encoding an original data stream using an ADMA encoder using the unique ADMA code such that an encoded data stream is created;
   transmitting the encoded data stream to the receiver;
   filtering interference from the encoded data stream to obtain a substantially interference-free encoded data stream using an ADMA filter which is a closed form solution derived by a noise-transparent autocorrelation matching analysis and incorporating the unique ADMA code; and
   decoding the substantially interference-free encoded data stream by an ADMA decoder such that the original data stream is substantially obtained.

2. The method of claim 1 further comprising storing the unique ADMA code for each user device connected to the multiple access communications network.

3. The method of claim 1 wherein the step of encoding the original data stream further comprises using an ADMA encoder that is invertible and that has the property that the autocorrelation of the encoded data stream is the same as the unique ADMA code on a noise-transparent set of time-lag variables.

4. The method of claim 1 wherein the filtering step further comprises computing a weighted sum of the encoded data stream.

5. A non-transitory computer readable medium having computer executable instructions for transmitting data in a multiple access communications network having a remote node for generating a unique autocorrelation division multiple access (ADMA) code for reducing interference in a data transmission to at least one user device connected to the multiple access communications network and encoding an original data stream using an ADMA encoder using the unique ADMA code such that an encoded data stream is created, the computer executable instructions comprising
   instructions for receiving the unique ADMA code from the remote node;
   instructions for receiving the encoded data stream from the remote node;
   instructions for filtering interference from the received encoded data stream to obtain a substantially interference-free encoded data stream using an ADMA filter which is a closed form solution derived by a noise-transparent autocorrelation matching analysis and incorporating the unique ADMA code;
   instructions for decoding the substantially interference-free encoded data stream by an ADMA decoder such that the original data stream is substantially obtained.

6. The computer readable medium according to claim 5 wherein the instructions for filtering interference further include instructions for computing a proper weighted sum of the received encoded data stream.

7. The computer readable medium according to claim 5 wherein the instructions for encoding further comprise instructions for implementing an ADMA encoder that is invertible and that has the property that the autocorrelation of the encoded data stream is the same as the unique ADMA code on a noise-transparent set of time-lag variables.

8. A system for transmitting data in a multiple access communications network, the system comprising:
   a transmitter node comprising a processor configured to generate a unique autocorrelation division multiple access (ADMA) code for reducing interference in a data transmission to at least one user device connected to the multiple access communications network and an encoder configured to receive an original data stream and produce an encoded data stream using an ADMA encoder and the unique ADMA code for the at least one user device;
   the at least one user device comprising:
      a receiver configured to receive the encoded data stream from the transmitter node;
      an ADMA closed form filter derived by a noise transparent autocorrelation matching analysis, the ADMA closed form filter incorporating the unique ADMA code and producing a substantially interference free encoded data stream;
      a decoder that produces a substantially the original data stream from the substantially interference-free encoded data stream.

9. The system of claim 8 wherein the multiple access communications network is one of a cellular network, a computing network having a router and an ad hoc network.

10. The system of claim 9 wherein the at least one user device is a computer.

11. The system of claim 8 wherein the transmitter node is one of a computer router and a cellular base station.

* * * * *